United States Patent [19]

Ludwig

[11] Patent Number: 4,718,647
[45] Date of Patent: Jan. 12, 1988

[54] PNEUMATIC COUNTERBALANCE WITH DUAL FORCE

[75] Inventor: George C. Ludwig, Florence, S.C.

[73] Assignee: AVM, Inc., Marion, S.C.

[21] Appl. No.: 936,386

[22] Filed: Dec. 1, 1986

Related U.S. Application Data

[62] Division of Ser. No. 425,565, Sep. 28, 1982, Pat. No. 4,635,908, which is a division of Ser. No. 122,850, Feb. 20, 1980, abandoned.

[51] Int. Cl.⁴ .................. F16F 5/00; F16F 9/00
[52] U.S. Cl. .................. 267/64.11; 188/322.15; 188/322.16; 188/322.21; 267/64.15; 267/64.25; 267/120; 267/124; 267/129
[58] Field of Search .................. 267/64.11–64.28, 267/120–129, 113, 118; 188/269, 317, 282, 322.18, 322.21, 322.22, 322.16, 322.13, 322.14, 322.15, 284, 316, 281, 129, 322.17, 371–377; 293/133–134; 92/162, 181, 182–185

[56] References Cited

U.S. PATENT DOCUMENTS

| Re. 28,329 | 2/1975 | Nicholls | 267/64.28 |
|---|---|---|---|
| 2,882,592 | 4/1959 | De Carbon | 188/269 X |
| 3,207,498 | 9/1965 | Wüstenhagen et al. | 267/64.11 |
| 3,837,445 | 9/1974 | Pierle | 188/282 X |
| 3,868,097 | 2/1975 | Taylor | 267/64.13 X |
| 3,927,871 | 12/1975 | De Baan | 267/64.11 |
| 3,995,842 | 12/1976 | Freitag | 188/376 |
| 4,003,454 | 1/1977 | Wössner | 293/134 X |
| 4,079,925 | 3/1978 | Salin | 267/129 |
| 4,088,207 | 5/1978 | Kato | 188/322.15 |
| 4,123,859 | 11/1978 | DeKonig | 188/282 X |
| 4,194,731 | 3/1980 | Marx | 267/120 X |
| 4,221,367 | 9/1980 | Smith | 267/64.15 |
| 4,310,148 | 1/1982 | Freitag | 267/120 X |
| 4,548,389 | 10/1985 | Smith et al. | 267/129 X |
| 4,613,115 | 9/1986 | Smith | 267/120 X |
| 4,635,908 | 1/1987 | Ludwig | 267/64.11 |
| 4,650,165 | 3/1987 | Siemann | 267/120 X |

FOREIGN PATENT DOCUMENTS

| 2622879 | 11/1976 | Fed. Rep. of Germany | 188/282 |
|---|---|---|---|
| 53-76271 | 7/1978 | Japan . | |
| 1512884 | 6/1978 | United Kingdom | 188/282 |

*Primary Examiner*—Douglas C. Butler
*Attorney, Agent, or Firm*—Nies, Webner, Kurz & Bergert

[57] ABSTRACT

A pneumatic spring counterbalance extensible link including a closed end cylinder with an end connector a piston and rod assembly within the cylinder and maintained therein by the crimped over end portion of the cylinder retaining a rod bushing and rod to cylinder seal. The cylinder is pressurized prior to assembly of the complete piston and rod into the cylinder. The piston assembly includes orifice by-pass arrangements either in the piston periphery or in a piston ring, and the piston may include a fail-safe provision in the event the orifice is clogged. A crimping die assembly is used in assembling and completing final assembly of the counterbalance components while simultaneously maintaining the link in a pressurized environment, utilizing sealed arrangement between the crimping dies to maintain pressurization of the interior of the dies and the counterbalance components prior to assembly of the components. A dual force embodiment of the counterbalance unit is disclosed and utilizes a floating sealed piston below the main piston and rod assembly entrapping pre-charged gas in the space between the floating piston and the closed end of the cylinder.

15 Claims, 28 Drawing Figures

PNEUMATIC COUNTERBALANCE WITH DUAL FORCE

CROSS-REFERENCE TO RELATED APPLICATIONS

This application is a division of application Ser. No. 425,565, filed Sept. 28, 1982, now U.S. Pat. No. 4,635,908 which is a division of application Ser. No. 122,850, filed Feb. 20, 1980, now abandoned.

BACKGROUND OF THE INVENTION

Pneumatic counterbalance units have come into widespread use in recent years, being used on various automotive components such as hoods, trunk lids, hatch backs and on other items such as machine covers, doors and hatches. Such pneumatic couterbalances are rather simple pneumatic piston/cylinder arrangements having a bleed by-pass through or past the piston similar to shock absorbers and oleo struts used on vehicles and aircraft for many years. The well-known principle of operation is based on differential pressure resulting from the differential in cross section areas of the two chambers within the cylinder caused by the piston rod on one side of the piston which reduces the area on that side of the piston. Pneumatic counterbalance units, prior to this invention, have been pressurized subsequent to assembly, past the shaft seal, or through a fill valve or a fill port which is sealed after pressurization. Prior art units utilize orifice bleed passages through the piston or through the piston rod from one side of the piston to the other side and more sophisticated units have a valving device which varies the bleed rate depending on the direction of movement of the piston. Other forms of counterbalance devices provide a dual force by using a supplemental compression coil spring which becomes effective at an intermediate position of the piston rod retraction stroke.

Examples of prior art counterbalance units can be seen in the following U.S. Patents: U.S. Pat. Nos. 1,994,722 to O. W. Landerslager for Resilient Device; U.S. Pat. No. 2,774,446 to Bourcier de Carbon for Shock Absorbers; 2,788,867 to A. R. Causse for Shock Absorber; 3,207,498 to E. Wustenhagen et al for Gas Spring; 3,222,047 to F. Tuczek for a Pneumatic Suspension Unit; 3,589,701 to D. W. Gee for Vehicle Suspension (Gas Spring); 3,856,287 to Freitag for Piston Rod Seal For Adjustable Pneumatic Spring; 3,868,097 to P. H. Taylor for Liquid Spring; 3,913,901 to W. Molders for Resilient Supporting Column; 3,963,227 to W. Molders for Gas Spring with Dual Damping; 4,030,715 to H. O. Duran for Pneumatic Shock Absorber; 4,064,977 to D. F. Taylor for Fluid Amplified Shock Absorber Having De Laval Nozzle; 4,098,302 to Freitag for Method for Charging Pneumatic Suspension Element; and 4,108,423 to J. J. Skubal for Gas Spring. Most of the foregoing patents disclose various types of piston unit orifices and of different kinds of seals between the piston rod and cylinder, some being plural O-rings or flat washers or a combination of both kinds and some, e.g., Taylor and Duran use chevron seals. Duran shows an anti-friction ring on the piston with plural peripheral notches providing free-flow by-pass of fluid. Some disclose methods of pressurizing, e.g., De Carbon shows a valved inlet; Tuczek shows a multiple inlet system with lines and accumulators; Freitag U.S. Pat. Nos. 3,856,287 shows a ball check valve; and Freitag 4,098,302 charges gas and liquid past the seals. The Taylor U.S. Pat. No. 3,868,097 teaches a structure and method of assembly for a liquid spring.

SUMMARY OF THE INVENTION

The increase of use of pneumatic counterbalance units in consumer items has required increased production which can result in lack of quality control, e.g., manufacture requires pressurization by various techniques of introducing gas into the cylinder following assembly and results in lack of accurate control over the requisite force needed for specific applications. By the present invention a method and tool structure has been developed to make a gas spring counterbalance and includes pressurization within a crimping die assembly, just prior to completely inserting the piston and rod assembly, and maintaining the pressurization during crimping of the cylinder. This results in very accurate quality control of the pressurization of completed units. A unique die assembly was developed to accommodate the method of assembly.

Further developments included a different shaft seal arrangement and providing extruded piston rings with preformed peripheral orifice control grooves and specially constructed piston rings with bi-directional by-pass and metering orifices to control linkage extension and retraction speeds.

To avoid the detrimental aspects of the extensible link becoming a fixed length link should the metering orifice become clogged, a fail-safe feature has been developed to release the piston seal if the extension force exceeds a certain value. Also it is desirable in some installations to have a dual force capability in the counterbalance unit. To solve this problem and avoid use of mechanical springs which can break or lose their spring force over a period of extended use, a floating piston concept was developed. Such a floating piston is pre-inserted and entraps gas in a lower chamber within the cylinder and its assembly and pressurization can be accommodated by the assembly tools and method of this invention.

OBJECTS OF THE INVENTION

A primary object of this invention resides in the provision of a novel pneumatic counterbalance link. The link is pressurized before and during the assembly step. The piston rod is sealed by a large O-ring or the equivalent which also seals against the cylinder and end bushing. Unidirectional seal rings, such as a chevron seal, can be used if desired. Several novel embodiments of metering orifices across the piston in the counterbalance combination unit include a preformed radial orifice groove in a piston flange, a pre-formed peripheral metering groove in an extruded piston ring or providing pre-formed metering grooves with correlated by-pass grooves in an O-ring held between axially spaced piston flanges. Use of grooves in the piston ring to provide the by-pass orifices and the metering orifices results in an advantage over the apertured type orifices because the grooves will inherently self clean as the stroke is reversed and the ring moves away from engagement with the piston flange. Resiliency of the O-ring results in flexing of the grooved areas of the O-ring and aids in eliminating any contaminants or clogging. The piston flanges enable provision of a fail-safe structure which is accomplished by controlled thickness of all or a portion of one of the flanges enabling failure by at least a partial destruction of the flange under pre-calculated applied force, resulting in eliminating the orifice controlled bleed past the piston but retaining the basic pneumatic counterbalance action of the counterbalance link.

A further object of this invention resides in the provision of a novel method of assembly of pneumatic counterbalance units wherein the components of the unit are positioned within crimping die tools in a crimping press with a small quantity of oil for lubrication pre-introduced into the cylinder component; the die parts with the components of the unit are moved toward assembly; the die tool parts engage and provide a sealed compartment surrounding all components of the counterbalance unit. At this stage of assembly the die tool compartment is pressurized by gas (e.g., air or nitrogen) under pressure through valve controlled pneumatic pressurizing connections from a pressure source. While pressurized the press movement continues, the crimping die parts move closer and the piston-assembly parts including the rod seal and the end bushing move into the cylinder entrapping a quantity of pressurized gas within the cylinder. As the press action continues, the open end wall portion of the cylinder is crimped inward by the crimping die tool which retains the bushing, seal, rod and piston in the cylinder and completes the assembly. Via suitable valve control, the sealed die compartment is vented, pressurization is released, the press is reversed, the tools part and the completely assembled counterbalance unit is removed.

As further objects of the invention, the same assembly method can be used to assemble a dual force counterbalance unit, which will include a floating peripherally sealed piston in the cylinder below the rod and primary piston assembly. The floating piston component can be carried on the bottom of the primary piston, adhered thereto by magnetic force or by use of a sticky substance, such as grease, or the like. As the die parts move toward each other and create the sealed compartment an initial pressurization of the compartment is caused, and the floating piston is introduced into the cylinder to a point which accomplishes a sealed relationship with the cylinder, whereupon the die compartment is subjected to higher pressurization, the floating piston separates from the primary piston and moves into the cylinder to an intermediate location of equalization of pressures on both faces and an additional small quantity of oil for lubrication is introduced into the cylinder on top of the floating piston. Continued movement of the press and crimping dies completes the assembly of the piston and rod into the cylinder and crimps the cylinder, followed by removal of pressurization, parting of the die parts and removal of the completed unit.

Still another object of the present invention resides in the provision of novel apparatus to accomplish the combination single stroke assembly and pressurization of a pneumatic counterbalance unit. In conjunction with this object is the provision of a novel crimping die tool set for use in a machine press including jig structures to maintain counterbalance components in pre-assembly positions and having structure to provide a closed sealed cavity around the counterbalance components together with a system to controllably pressurize and de-pressurize the cavity during the final stages of assembly of the counterbalance unit. A further novel feature resides in provision for pressure injection of a predetermined quantity of lubricating oil into the cylinder after pressurization of the die cavity. This feature can be used to introduce oil into the bottom of the cylinder as well as on top of the floating piston.

Further novel features and other objects of this invention will become apparent from the following detailed description, discussion and the appended claims taken in conjunction with the accompanying drawings.

BRIEF DESCRIPTION OF THE DRAWINGS

A preferred structural embodiment of the apparatus and various embodiments of the pneumatic counterbalance of this invention are disclosed in the accompanying drawings, in which.

GENERAL DESCRIPTION

Figure 5:
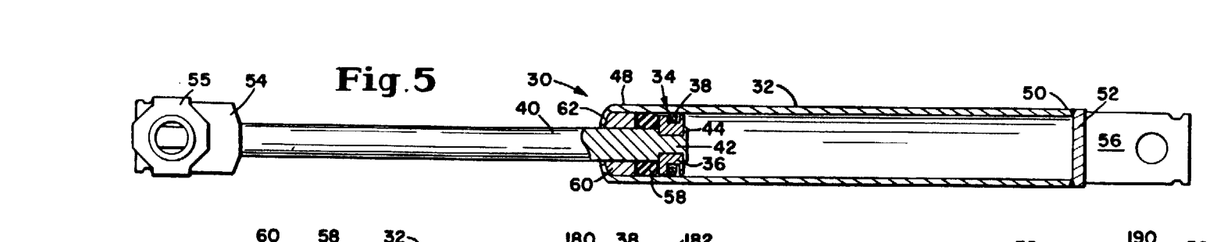
FIG. 5 is a partially sectioned elevation view of a complete pneumatic counterbalance link unit according to this invention.
Figure 10:
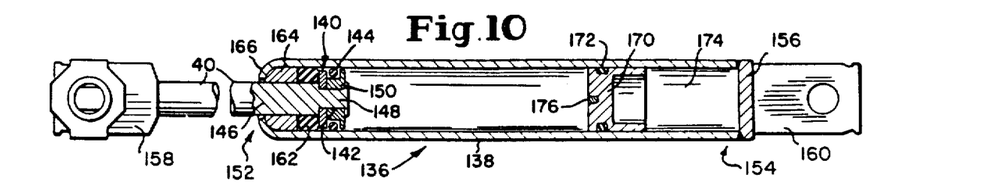
FIG. 10 is a further embodiment of a counterbalance unit which includes the same components shown in FIG. 5–9 and in addition includes a floating piston to provide a dual force counterbalance link.
Figure 17:
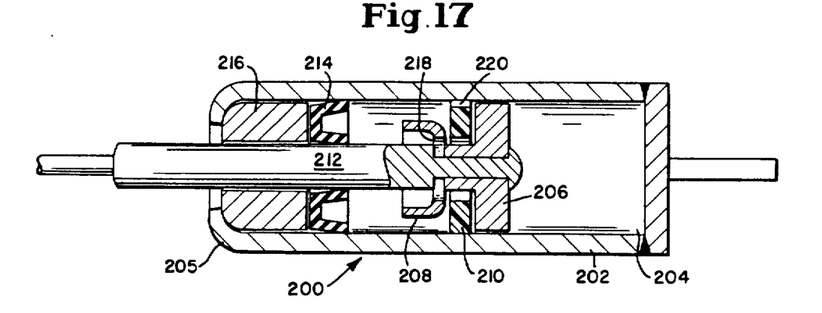
FIG. 17 is a further embodiment with a modified piston assembly with metered orifice extruded in the outer periphery of the piston ring.

The various aspects of the invention herein include articles known as pneumatic or gas springs, which for convenience can be referred to as counterbalance links, as well as an apparatus and method for making the articles. Representative embodiments of the counterbalance links are seen in FIGS. 5, 10 and 17 as well as in various other detail views. FIGS. 5 and 10 of the original Patent Drawings are full scale of actual units.

The first portion of this description will be directed to the apparatus for making (or assembling) the counterbalance links but initially reference is to FIG. 5 where is shown a representative embodiment of a counterbalance link 30 having a cylinder 32 whose length will be determined by the kind of equipment with which the unit is used. Within the cylinder is a piston assembly 34 which separates the cylinder into two compartments which are filled with gas (e.g., air, nitrogen or some other inert gas) under pressure. The piston assembly includes a free fitting piston 36, a piston ring 38 and the piston rod or shaft 40 secured at one end 42 to the piston 36 as by swaging over or riveting the end at 44. These pneumatic counterbalance units, particularly in automotive installations are often pressurized up to around 2000 psi gas pressure. Pressures can be higher or lower depending on the installation. A counterbalance unit with a piston rod having approximately 0.10 inch cross-section area will provide a 5 pound extension force when the cylinder is pre-pressurized at approximately 50 psi, and a 200 pound force when pressurized at 2000 psi.

Figures 1, 2, 2A:
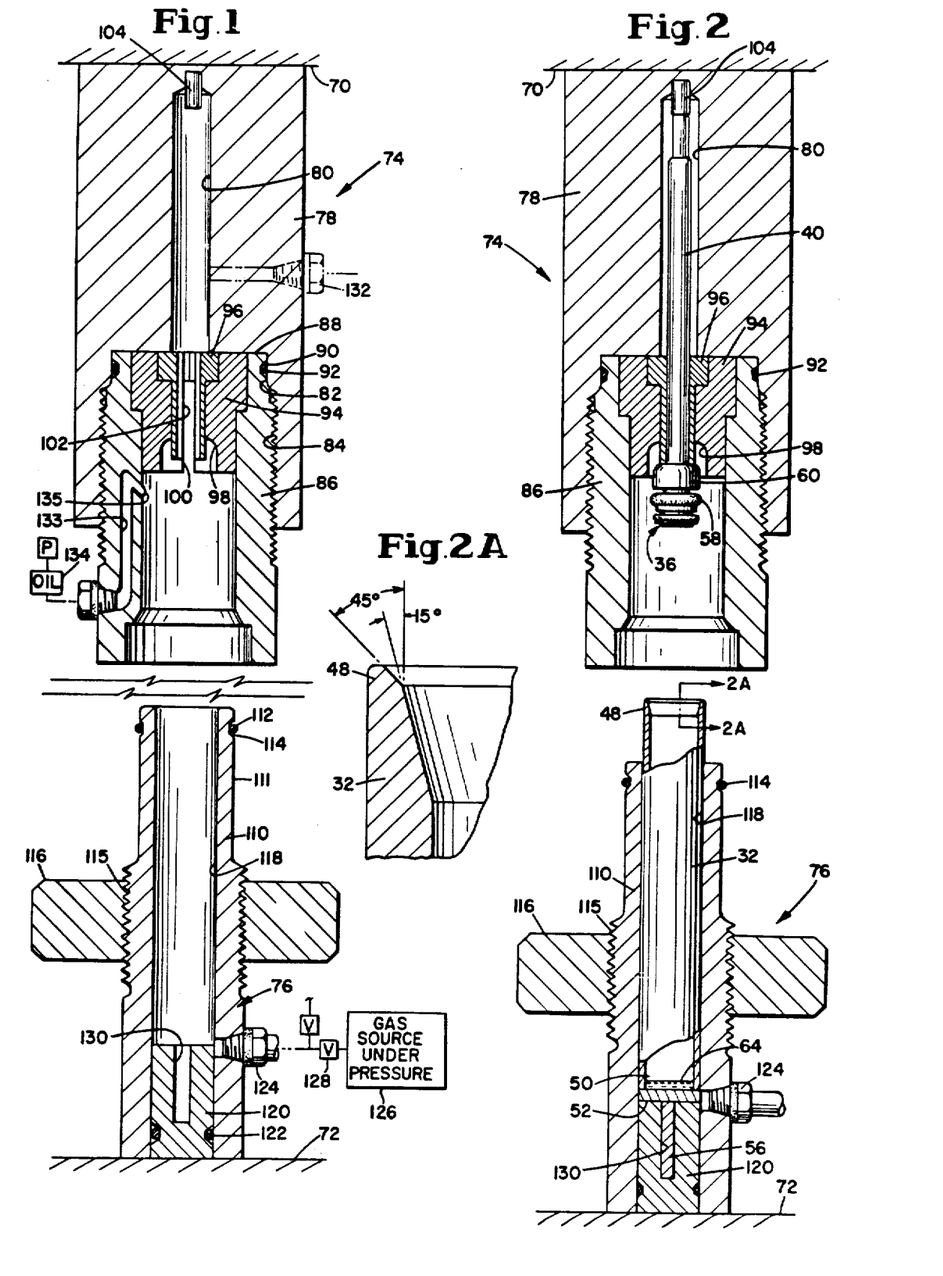
FIG. 1–4 illustrate apparatus in accord with this invention by which the inventive method can be carried out to assemble and pressurize a completed pneumatic counterbalance unit, FIGS. 1, 2, 3 and 4 showing respective progressive stages and positions of the press heads, crimping dies and counterbalance components to final assembly of the inventive counterbalance unit.
FIG. 2A is an enlarged detail section taken on line 2A—2A of FIG. 2 through the open end wall of a counterbalance cylinder component prior to assembly.
Figure 3:
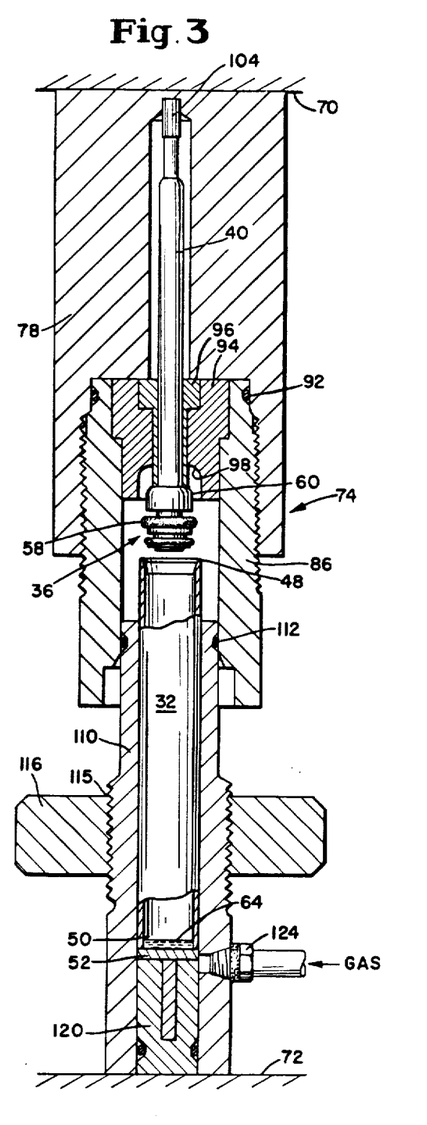
Figure 4:
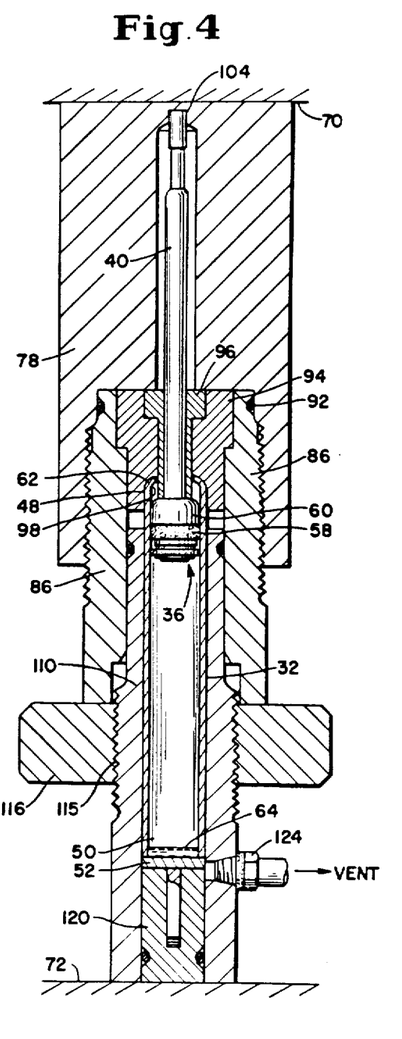

The piston shaft 40 projects out through one end 48 of cylinder 32, the other end 50 of which is closed, as by welding a disc 52 thereto. The projected end of shaft 40 has a connector link 54 rigiidly secured thereto, as by screw threads or welding, and a second connector link 56 is secured to the cylinder closed end 50, as by screw threads or welding. Within the cylinder, shaft 40 passes through a large O-ring seal 58 and a shaped bushing 60 which has a free close-fit around the shaft 40 and within cylinder 32. With the open cylinder end 48 crimped at 62 the bushing 60 provides an end stop abutment for piston movement cushioned by the O-ring seal 58. Internal gas pressure keeps the seal 58 and bushing 60 in the end position against the crimped end of cylinder 32. As shown in FIGS. 2-4, a pre-determined small quantity of oil 64., e.g., 3-4 cc is placed into cylinder 32 prior to assembly and provides lubrication for the piston ring and the large O-ring seal 58. Unit 55 represents an attachment clip and is not per se a part of this invention.

Suitable materials for the various components can be mandrel drawn hydraulic steel tubing for the cylinder, sheet steel for the end disc, the piston shaft is hardened, chrome plated steel, the bushing can be made from aluminum or steel, the O-ring is elastomeric, e.g. rubber or plastic, and the piston is made from aluminum. As will be described in detail, the piston and ring components can be and are preferably made from various other materials depending upon the configuration or modification of design. The piston and its ring, as are true of pneumatic springs, are constructed to provide controlled by-pass flow of gas from one side of the piston to the other side. There is a relatively free flow by-pass provided during the retraction or compression stroke and an "orifice" metered flow of gas past the piston during the extension or expansion stroke.

ASSEMBLY APPARATUS

Turning back now to FIGS. 1-4, the apparatus for assembling the counterbalance units as seen in FIGS. 5 and 10 includes a special crimping die tool set fastened to the head 70 and bed 72 of a machine press, which can be any known kind readily available in machine shops. The crimping die tool has upper 74 and lower 76 assemblies which will be affixed respectively to the head and bed of the press and in working alignment as shown in FIGS. 1-4. In the following description of the tool apparatus and the method of assembly of a counterbalance link, reference will be made to counterbalance link 30 and its referenced components as shown in FIG. 5.

FIG. 1 shows the upper and lower crimping die assemblies 74 and 76 fastened to the press. The crimping die set is constructed to enable assembly, pressurization and crimping of the work piece (counterbalance link) in one operation, and the upper and lower die assemblies will seal with one another via a dynamic gas tight seal, such as an O-ring, during an initial pressing movement of the press head, to enclose the components, during the remainder of the assembly operation, within a pressurized gas-tight chamber.

The upper die assembly 74 has a steel base 78 with a counterbore 80 sized to receive the shaft 40 of the piston and shaft subassembly. Base 78 also has a large counterbore 82 the outer portion 84 of which is threaded and receives an externally threaded die holder sleeve 86 which has an inner end 88, having an outer circumferential groove 90 carrying a sealing O-ring 92, which spigots and seals in the base counterbore 82. Inset into and seated within the inner end of the die holder sleeve 86 is an upper crimp die 94 made from tool steel. Carried within the die 94 and seated in the upper end is a sleeve insert 96 through which the pre-assembled piston and shaft assembly is inserted with a close sliding fit. The insert sleeve 96 projects downward within the confines of the die crimping face 98 a sufficient distance to keep the bushing 60 of piston and shaft assembly away from the crimping surface to permit spacing for the crimping operation on the cylinder end 48.

Note: If a flat end connector link 54 is pre-welded to the projected end of shaft 40, then the crimp die 94 will have to have diametral clearance slots 100 and the sleeve insert 96 will also have to be slotted as at 102 to provide clearance for the connector link to pass through and up into the counterbore 80. The latter can be accomplished by making the sleeve insert in two parts. The pre-assembled piston and rod assembly is held in the upper die assembly with a low force which can be accomplished by a permanent magnet 104 fixed at the base of counterbore 80.

The lower die assembly 76 includes a sleeve shaped base part 110 fixed to the press base 72 and upstanding in coaxial alignment with the upper die assembly 74. The upper end 111 of the lower die base is dimensioned to be received within the upper holder sleeve 86 and during the initial work stroke of the press will telescope into the lower end of holder sleeve 86 and be sealed thereto by an O-ring 112 maintained in an outer circumferential groove 114, as shown in FIG. 3. An intermediate portion 115 of the base sleeve 76 is externally threaded and carries a large stop nut 116 used to provide a limit stop for the press stroke, as shown in FIG. 4.

Interior 118 of sleeve 110 is cylindrical and made to have a close loose fit with the subassembled counterbalance cylinder 32 which is pre-inserted, base down, into the die part 76. When so inserted, cylinder 32 rests against a steel plug insert 120 situated in the bottom of sleeve interior 118 and seated against the press bed. Plug 120 is externally grooved and carries an O-ring seal 122 which seals against the die sleeve interior 118. Just adjacent the top of plug 120, the lower die sleeve is radially tapped to receive a pressure line fitting 124 from a gas source 126 under pressure via fluid controls 128 which in a pre-determined sequence will pressurize and depressurize (vent) the crimping die assembly. An alternate location for the pressurized gas connection can be in the upper die base 78 as shown in phantom line at 132.

FIG. 1 shows a modification to the die set where an oil passage 133 is formed in the upper die holder sleeve 86 and a unit 134 consisting of an oil pressurizing pump is connected thereto to introduce a small pre-determined quantity of oil under pressure through a directed orifice 135 into a cylinder component when the upper and lower die assemblies are sealed and pressurized.

Shown in FIG. 2, a counterbalance cylinder 32 which includes a small quantity, e.g., several cc of lubricating oil, is placed into the lower die sleeve interior 118 so its closed end is resting on plug 120. If a flat connector link 56 is welded on the end of cylinder 32, a slot 130 in plug 120 will receive the connector link. The open end of counterbalance cylinder 32 projects above the top end of the lower die sleeve 110 as seen in FIG. 2.

OPERATION OF APPARATUS AND METHOD OF ASSEMBLING COUNTERBALANCE LINK

Using the crimping apparatus previously described and with the press in the inoperative open condition (FIG. 1), a cylinder component 32 is placed in the lower crimping die assembly 76 and a sub-assembled piston assembly 30 with shaft 40, seal 58 and bushing 60 is placed into the upper die assembly 74 so the components are disposed as shown in FIG. 2. The press work stroke is then initiated, bringing the upper die assembly 74 down toward and into engagement with the lower die assembly 76 to the intermediate relationship shown in FIG. 3 where the O-ring seal 112 engages and seals against the inner surface of the upper die holder 86. At this precise stage, the interior of the engaged die parts is a sealed cavity, all sub-components of the counterbalance link are inside that sealed cavity, and the cavity is pressurized with a suitable gas under pressure. The pressure will be determined by the nature of the intended use of the counterbalance link. It will be from several times atmospheric pressure up to at least 2000 psi and if desired above 2000 psi. Most requirements will be satisfied by pressures from 400 to 2000 psi which can be accommodated by components of gas pressurized devices.

At this stage or instant in the press stroke, the charge of gas in the cavity is a specific predetermined quantity and pressure and will be the same for every work piece being made. As the press continues its stroke, the projected piston, and the O-ring 58 enter the cylinder 32. Shown in the detail FIG. 2A, the internal peripheral edge of the open end 48 of cylinder 32 is chamfered with a duble entry chamfer of 15° and 45° to facilitate introduction of O-ring 58 seals against the inner cylinder surface, a predetermined quantity of pre-pressurized gas is trapped inside the cylinder and is compressed still further by continued operational movement of the press and the crimping dies. Final movement of the press, as shown in FIG. 4, causes the inner crimping face 98 of the upper crimp die 94 to abut the cylinder end 48 and pressure crimp the wall end inward to complete the final assembly operation of the pneumatic counterbalance link.

As the press starts on its return stroke, the pressurizing line controls will be operated manually or automatically in a known manner to shut-off the pressure flow and to vent the die assembly and release pressure from the cavity as the press is moving the die assemblies toward the unsealed condition, so that the cavity is not pressurized when the cavity becomes unsealed. The completed workpiece is removed and the cycle repeated.

METHOD APPLIED TO ASSEMBLE DUAL FORCE COUNTERBALANCE LINK

The same apparatus just described relative to FIGS. 1–4 can be utilized to assemble a modified version of the single force pneumatic counterbalance link, i.e., it can be used to assemble, pressurize and crimp a dual or plural force gas spring, which will be hereinafter described.

A dual slope output force is employed in some pneumatic springs presently being used to "pop" open an automotive trunklid a predetermined amount of about two inches. The lid will then stay at that position until manually opened for another amount where the pneumatic spring linkage geometry is such that the lid will open and stay open by spring force only. Prior to the present invention, dual force has been accomplished by the addition of a small compression spring installed into the pneumatic spring cylinder prior to insertion of the piston and rod assembly. In normal use when that pneumatic spring is compressed, an additional force must be applied for the final portion of the compressed stroke when and after the piston has contacted the compression spring.

This invention accomplishes the dual slope feature pneumatically by incorporating a floating piston in the pneumatic spring cylinder. When the piston, which is fixed to the piston rod, is in engagement with the floating piston the output force will increase at a higher rate.

Figure 11:
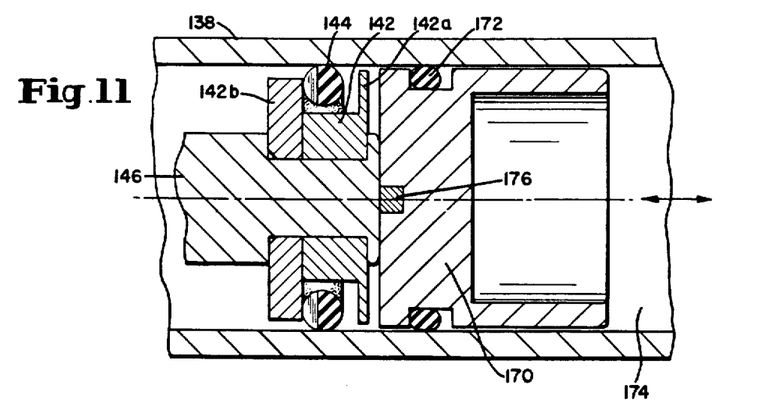
FIG. 11 is an enlarged detail section of the unit in FIG. 10 showing the primary piston and the floating piston positioned in the overload secondary force condition.

FIGS. 10 and 11 show the dual force output counterbalance link 136 with a floating piston 170 having an elastomeric sealing O-ring 172. Link 136 and components are hereinafter more specifically described but basically include similar parts and construction as in the unit 30 of FIG. 5, plus a floating piston. With such a floating piston the cylinder encompasses one sealed compartment 174 behind piston 170 and the two compartments, one on each side of the primary by-pass piston as is true in unit 30.

FIGS. 12–16 depict the method of assembly of the dual force counterbalance link 136 in a somewhat schematic manner.

Figures 12, 13, 13A, 14, 15, 16:
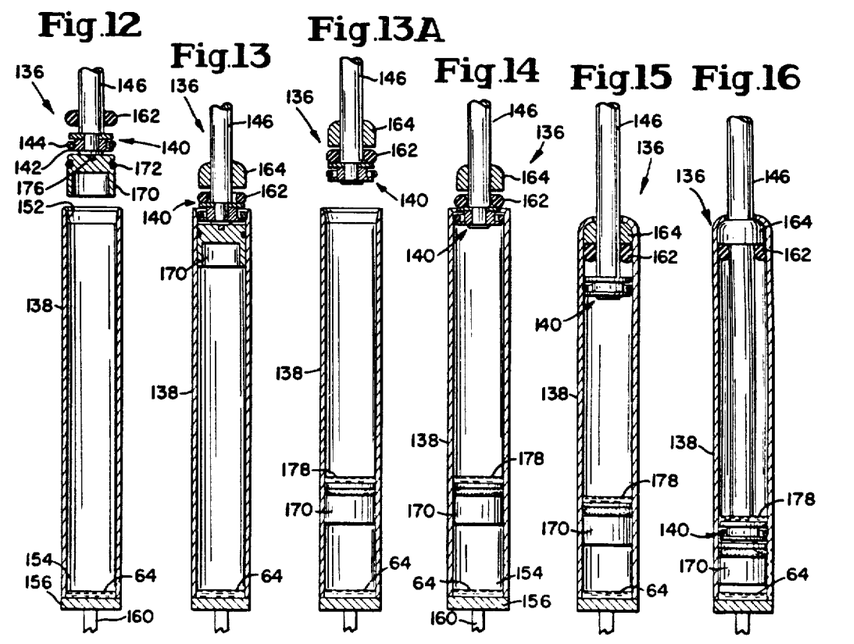
FIGS. 12, 13, 13A and 14 are somewhat schematic depictions of stages of assembly of a dual force counterbalance link such as shown in FIG. 10.
FIG. 15 is a schematic depiction of a completely assembled and pressurized dual force unit with the primary piston spaced from the floating piston in a normal force condition.
FIG. 16 is a schematic depiction like FIG. 15 but illustrates the two pistons engaged and disposed in an overload force condition.

FIG. 12, corresponding to FIG. 3, shows the initial pressurization mode, where the cylinder contains the small amount of lubrication oil 64 previously mentioned with neither of the pistons yet inserted into the cylinder. The floating piston 170 may be temporarily attached to the fixed piston assembly 140 by magnetic attraction (e.g., small magnet 176) or by some other controlled method such as sticky grease. The crimp die chamber is intially pressurized to a value which is below the final pressure.

FIGS. 13 and 13A depict the positions where the press has moved to accomplish insertion only of the floating piston to a sealed condition and then (FIG. 13A) is backed off slightly to remove the fixed piston from the floating piston, whereupon the crimp die chamber is immediately subjected to the higher final pressure and a predetermined quantity of oil 178 injected via the orifice 135 shown in FIG. 1.

FIG. 13A depicts the disposition of components after final pressurization has freed the floating piston from the fixed piston connection (the magnetic holding force being lower than that holding the fixed piston in the upper die assembly) and displaces the floating piston 170 into the cylinder compressing the gas ahead of it into compartment 174 until it equals the final pressure and a balance of pressure will exist across the floating piston 170 and the small quantity of oil 178 has been introduced on top of the piston 170. FIG. 14 shows the upper die assembly moved down to introduce the fixed piston 142, O-ring 162, and bushing 164 into the cylinder 138. Final assembly is accomplished by the same further steps as described with respect to FIGS. 1–4.

FIG. 15 depicts normal operation where the fixed shaft piston 140 moves in and out without contacting the floating piston 170. The output force is equal to the internal pressure acting on the piston rod area.

FIG. 16 depicts the overload force mode where the fixed piston 140 contacts the floating piston 170. Displacing the piston rod 146 into the cylinder 138 displaces the floating piston 170 which is now in contact with the fixed piston assembly 140 and both pistons move together. The output force on rod 146 is equal to the normal gas pressure acting upon the piston rod area and the differential pressure across the floating piston. Due to the large area of the floating piston 170 and the relatively small gas volume ahead of it, the output load slope will increase and at a much higher rate. Another desirable feature of the operation in the overload mode is the elimination of piston orifice dampening because there is no flow across the fixed piston. This will assist the desired initial "pop" open of an automotive trunk lid upon unlatching.

PNEUMATIC COUNTERBALANCE LINKS

This invention includes a gas spring or pneumatic counterbalance link as has been previously described. The link can be a single force output link 30 as described with reference to FIG. 5 or a dual output force link 136 as hereinbefore described with reference to FIGS. 10 and 12–16. In either case the fixed piston assembly, as illustrated, includes a construction which provides essentially free by-pass flow of gas across the piston during a retraction or compression stroke and a metered orifice flow during the extension or expansion stroke. Several modified versions of the cooperation piston and ring assemblies are shown herein, any of the embodiments can be used in the single force link or the dual output force link. Depending upon the application of use of the counterbalance, free flow or metered orifice flow across the piston can be in the reverse of that just described, or free flow, or metered flow, could be provided for both directions of the piston stroke merely by reversing the installation of the piston ring or changing its configuration.

In FIGS. 5 through 9, the piston assembly is a single piece spool 36 with a thick flange 180 disposed toward the crimped end 62 of cylinder 32 and a thin flange 182 disposed toward the cylinder closed end 50. Piston 36 is slipped onto the reduced diameter end 42 of piston shaft 40 and the end 42 then swaged over or riveted to securely fasten the piston. The diameter of thick flange 180 is predetermined to provide sufficient clearance from the cylinder wall to enable unrestricted gas flow through the annular space 184. The diameter of the thin flange 182 also has sufficient clearance to enable unrestricted flow of gas through annular space 186. Disposed within the groove of piston spool 36 is a special molded piston O-ring 38 made of flexible elastomeric material, such as synthetic rubber or plastics to permit stretching when the ring is slipped over the flanges. The piston spool can be made of two parts, as shown in FIG. 11, to permit the piston O-ring 38 to be molded from a synthetic plastic material which need not be stretchable, it can be assembled between the two parts of the piston. In either event, the piston O-ring 38 will have an inner diameter sufficiently larger than the base diameter 188 of the piston groove, and will be provided with several (4 shown) slots 190 on one side slightly less than $\frac{1}{2}$ diameter deep, to enable free flow by-pass openings for gas to flow across the piston 36 when being moved in a retraction operation as depicted by arrows in FIG. 7. On the other side of the O-ring is a single, formed (preferably pre-molded) orifice groove 192 which serves to provide orifice metered flow during the expansion stroke as shown by arrows in FIG. 6. In a typical installation such as FIG. 5, piston ring 38 is 0.45 inch diameter with a cross-section radius of approximately 0.100 inch and the cross-section orifice by-pass is 0.0006 sq. inch. The rod diameter is 0.314 inch, the cylinder I.D. is 0.620 inch and piston stroke approximately 3.75 inches.

In FIG. 10, the unit 136 is the same and has similar components as those of FIG. 5, e.g., cylinder 138, piston assembly 140 with the fail-safe piston 142 made in two parts 142a and 142b to enable a synthetic plastic piston O-ring 144 to be pre-assembled with the parts 142a and 142b on the end of piston shaft 146. The piston ring 144 has the same configuration as ring 38 and the piston 142 is staked or riveted at 150 on the end 148 of piston shaft 146. Cylinder 136 has a closed end 154 with end disc 156 and an open end 152. Connector links 158 and 160 are welded to the shaft and cylinder to enable installation as desired. Large elastomeric O-ring 162 against the end bushing 164 provides a combination static cylinder seal, dynamic shaft seal and compliant piston stop. The compliance will provide an additional cushion to decelerate extension movement and reduce noise at the end of the stroke. Crimped end 166 of cylinder 138 maintains the components of counterbalance unit 136 in assembly.

Unit 136 of course includes the previously described floating piston 170 with its sealing O-ring 172 trapping a predetermined quantity of pressurized gas between the piston 170 and the closed end of cylinder 138.

Figure 18:
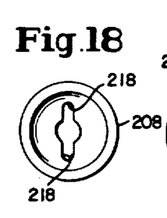
FIG. 18 is a plan view of the cup washer portion of the piston assembly shown in FIG. 17.
Figure 19:
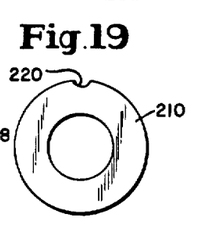
FIG. 19 is a plan view of the extruded piston ring of the piston assembly shown in FIG. 17.
Figure 19A:
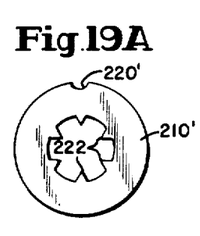
FIG. 19A is a plan view of a modified piston ring.

Another version of the pneumatic counterbalance link, made as afore-described, is shown in FIG. 17 with details shown in FIGS. 18 and 19. The link 200 includes the basic cylinder 202 with closed bottom 204 and crimped end 205 and the piston and rod assembly with piston parts 206 and 208, piston ring 210, shaft 212, chevron seal 214 and bushing 216. The piston is made in two parts, a single flanged spool 206 and a cupped washer 208 fitted together with piston ring therebetween and staked on the end of the shaft 212. The I.D. of the piston ring 210 and drilled orifices 218 in the inner portion of cup washer 208 serve to provide free flow by-pass of gas in the retraction movement of the piston. Piston ring 210 is cut from an extruded tube made from plastic material such as "HYTREL" and incorporates an extrusion formed orifice by-pass groove 220 on the outer periphery of the ring. In this embodiment when the cup washer 208 is used, the shaft and cylinder seal ring 214 can be a chevron seal, with the cup washer flange abutting the mid-section of the chevron seal to avoid damage to the seal lips at the end limit of the stroke. FIG. 19a is a modification 210' of the extruded piston ring 210 with orifice groove 220', and includes a plurality of internal ribs 222 which serve to coaxially locate the ring 210' on the piston and facilitate assembly.

Figure 20:
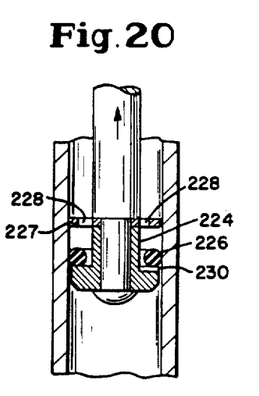
FIGS. 20, 21 and 22 are detail section views illustrating extension, retraction and neutral conditions of a still further embodiment of a piston assembly.
Figure 21:
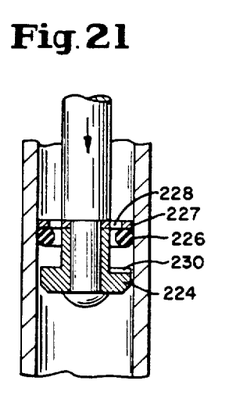
Figure 22:
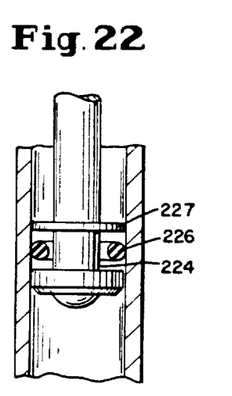
Figure 22A:
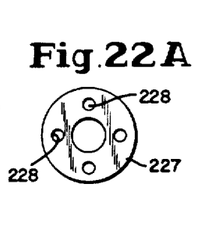
FIG. 22A is a plan view of the upper piston washer of the FIG. 20 device.

FIGS. 20, 21 and 22 illustrate a further embodiment in which a two part piston 224 is used with a plain O-ring piston ring 226 whch has its I.D. spaced from the inside diameter of the piston spool 224. The upper flange part 227 (FIG. 22a) of the piston has free flow by-pass apertures 228. The lower flange of the piston has a radial metering orifice slot 230 formed therein as by coining. Retraction movement of the piston permits free flow of gas across the piston ring 226 as shown in FIG. 21, and extension movement of the piston results in orifice metered flow via orifice groove 230 across the piston as shown in FIG. 20. FIG. 22 shows a normal neutral position of the piston at rest.

Figure 23:
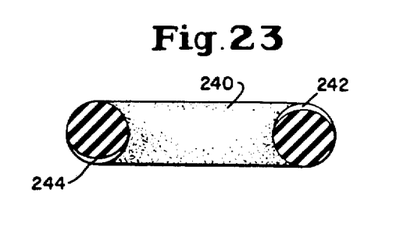
FIGS. 23 and 24 are detail views of a further piston ring molded embodiment with the metering orifice provided as a groove molded in the ring.
Figure 24:
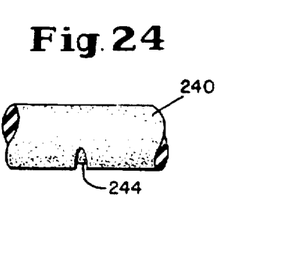

FIGS. 23 and 24 illustrate an alternate piston ring of molded rubber or plastic which can be used with the FIGS. 17 and 20 two part pistons. The piston ring 240 has single metering orifice slots 242 and 244, one on each side of the ring. This ring can be installed with either face against the downward flange and avoid erroneous upside down installation.

FAIL-SAFE PISTON

The counterbalance link has been developed to preclude the problem of orifice contamination by implementation of a feature which increases the orifice size when flow is reversed to facilitate the dislodging of any entrapped contaminants. In the event that the orifice remains permanently closed, a catastrophic failure of the counterbalance assembly or supporting structure will be precluded by a fail-safe piston design which allows a controlled failure of the piston ring supporting surface thereby allowing free flow of gases in both directions. The structural integrity of the unit, however, is not compromised and the counterbalance will continue to function without the rate controlled extension feature.

Contamination of the metering orifice will hydraulically lock the unit and such problems have been encountered particularly in units which incorporate a drilled orifice. Should an orifice become clogged when the spring is on a vehicle there is a possibility of damage to a door, linkage or failure of the spring if the door is forced with the spring hydraulically locked due to a clogged orifice.

Figure 6:
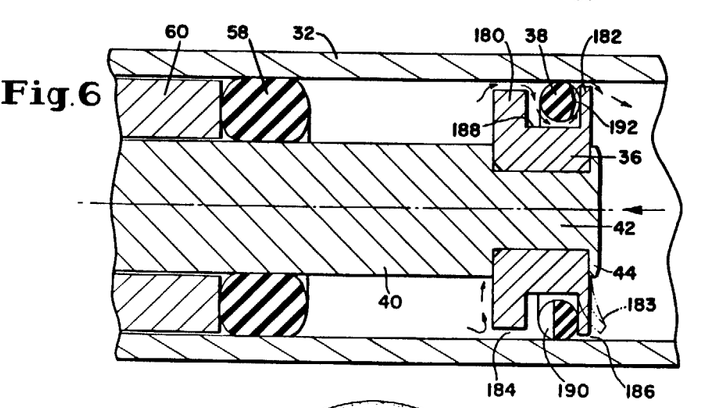
FIG. 6 is an enlarged cross section detail of the unit of FIG. 5 showing the shaft seal, the shaft, the piston and the piston ring in its metering position when the link is being extended.
Figures 7, 9:
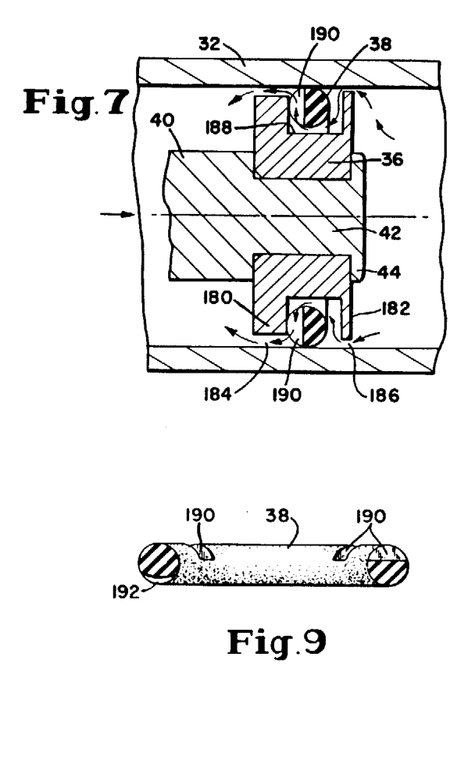
FIG. 7 is a view similar to FIG. 6 but showing the piston ring in the by-pass flow position which occurs when the link is being retracted.
FIGS. 8 and 9, respectively, a plan view and a cross section view taken on line 9—9 of FIG. 8, show the shape and groove details of the piston ring used in the unit of FIG. 5.
Figure 8:
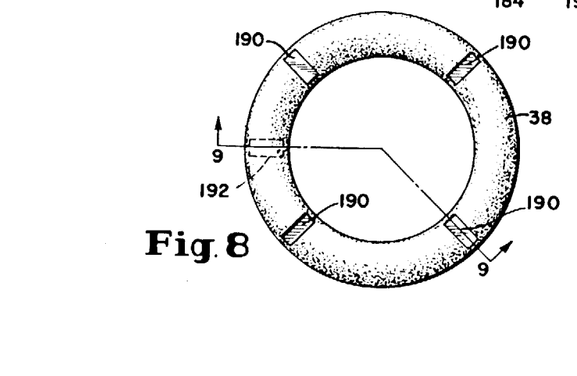

Applicant's fail-safe piston design is shown in FIGS. 5-7. The right hand piston flange 182 will be weakened by making it thinner or by addition of a fail-safe notch. Normal operation and load carrying capability will not be compromised since the loads with the piston bottomed in the extended condition are carried by the thicker lefthand flange. Should the orifice become clogged and the door forceably opened the piston forces will be applied to the right hand flange 182 with the fail-safe feature. An overload will deform the flange from the piston allowing the seal to "blow out". Deformation of flange 182 under such a circumstance is depicted by phantom line 183 in FIG. 6. The pneumatic spring will continue to function after this fail-safe feature has been actuated but operation will be without orifice controlled dampening.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A dual force pneumatic spring link comprising: a cylinder assembly with a closed end; a piston assembly in said cylinder with a piston shaft extending from the other end of said cylinder, a bushing on said shaft, an annular seal means around said shaft, a piston with a piston ring, sealing against said cylinder, fixed on the end of said shaft; the other end of said cylinder including means to retain said bushing; said seal means providing a static seal against the cylinder, and a dynamic seal around said shaft; said piston and piston ring providing means enabling metered orifice by-pass flow of gas across said piston during the extension stroke and a free flow by-pass fluid communication path across said piston during the retraction stroke; a predetermined small quantity of oil being contained in said cylinder; a predetermined accurate quantity of gas under at least several atmospheres of pressure in said cylinder, having been pre-loaded under pressure into said cylinder before, and maintained under pressure during, the final mechanical assembly steps of forced insertion of the shaft seal and bushing into the cylinder followed by providing the retaining means on the end of cylinder, whereupon said spring link contains and retains an accurately pressurized and predetermined quantity of gas; and said piston assembly further includes a second floating piston, with seal ring means, disposed between said shaft fixed piston and the closed end of said cylinder assembly with said gas under pressure being equalized on each face of said floating piston; said floating piston adapted to be engaged by said shaft fixed piston during a final portion of the retraction stroke of said shaft to provide a larger force biasing said piston and shaft toward an extended condition.

2. A pneumatic spring link as defined in claim 1, wherein said piston is a dual flange spool shaped piston means rigidly secured on the end of said shaft and the diameter of said spool flanges has a free spaced fit within said cylinder assembly to permit free flow of gas across said piston means; and said piston ring has fluid flow by-pass grooves and is located between the flanges of said spool shaped piston means and has a close fit with said cylinder; said piston ring being an O-ring with at least one of said by-pass grooves being a metering orifice groove passing metered fluid flow across said piston means when the piston means and shaft move to an extended condition.

3. A pneumatic spring link as defined in claim 2, wherein one of said flanges is made intentionally weak enough to destruct if said orifice by-pass groove becomes inoperative to cause the link to act as a fixed link; said weak flange being the flange closest to the closed end of said cylinder.

4. A pneumatic spring link as defined in claim 3, wherein said weak flange is made thin enough to deflect under a predetermined load tending to extend said shaft when said orifice by-pass groove is inoperative.

5. A pneumatic spring link as defined in claim 2, wherein said spool shaped piston means is made in two axial parts each of which includes a flange and said piston O-ring is a synthetic material.

6. A pneumatic spring link as defined in claim 2, wherein said spool shaped piston means is made in one part and said piston O-ring is made from rubber which can be stretched over the flange.

7. A pneumatic spring link as defined in claim 2, wherein said piston O-ring on one axial side has a plurality of radial by-pass grooves molded therein to enable essentially free flow of gas across the piston and piston ring during retraction movement and the said metering orifice groove is a radial groove molded in the opposite axial side of said O-ring.

8. A pneumatic spring link as defined in claim 1, wherein said annular seal means around said shaft is a large sealing O-ring which is deformed between said shaft and said cylinder internal wall surface and is maintained against said bushing by gas pressure to provide a static seal to the cylinder, a dynamic seal to the shaft and an end limit cushioning means for the extension limit position of said piston.

9. A pneumatic spring link as defined in claim 1, wherein said piston has two spaced flanges, the one closest to the crimped end of said cylinder having axially disposed apertures therethrough; said piston ring is an extruded synthetic material with a flow metering orifice groove extruded axially at one location on the piston ring outer periphery, the inner diameter of said piston ring being larger than and creating an annular space from said shaft and the ring outer diameter providing a close sliding fit with the inside surface of the cylinder member.

10. A pneumatic spring link as defined in claim 9, wherein said resilient annular seal is a chevron seal with the chevron flanges directed toward said piston, and said one spaced piston flange being cup shaped with the cup rim directed toward and in axial alignment with the mid-portion of said chevron seal.

11. A pneumatic spring link as defined in claim 1, wherein said annular seal means around said shaft is a sealing ring which is deformed between said shaft and said cylinder internal wall surface and is maintained against said bushing by gas pressure to provide a static seal to the cylinder, and a dynamic seal to the shaft of said piston.

12. A pneumatic spring link as defined in claim 1, wherein said means enabling metered orifice by-pass flow of gas across said piston during the extension stroke and a free flow by-pass flow during the retraction stroke comprises a groove in one of the group consisting of the piston and the piston ring, said groove being in the area of abutment between said piston and said piston ring which occurs during the extension stroke; whereby the relative movement of the piston and piston ring into and away from abutting engagement during extension and retraction provides said groove with a self cleaning flow action.

13. A pneumatic spring link as defined in claim 1, wherein said piston includes an annular groove in which said piston ring is retained with a loose free fit and said means enabling metered orifice by-pass flow of gas across said piston during the extension stroke and a free flow by-pass flow during the retraction stroke comprises a lateral groove in one of the wall surfaces of the annular groove in said piston, said lateral groove being in the area of abutment between said piston annular groove wall surface and piston ring which occurs during the extension stroke; whereby the relative movement of the piston and piston ring into and away from abutting engagement during extension and retraction provides said groove with a self cleaning flow action.

14. A pneumatic spring link as defined in claim 1, wherein a permanent magnet means is mounted interior of said cylinder.

15. A pneumatic spring link comprising: a cylinder assembly with a closed end; a piston assembly in said cylinder with a piston shaft extending from the other end of said cylinder; a bushing on said shaft; an annular seal means around said shaft; said piston assembly including a piston means with flanges and an annular groove therebetween providing a spool shaped piston with piston ring means disposed in the said groove between said flanges on the end of said shaft; the other end of said cylinder being crimp shaped to retain said bushing; said seal means providing a static seal against said cylinder, and a dynamic seal around said shaft; said piston and piston ring means providing means enabling metered orifice by-pass flow of gas across said piston assembly during one direction of piston movement; a predetermined small quantity of oil being contained in said cylinder; a predetermined accurate quantity of gas under at least several atmospheres of pressure in said cylinder, having been pre-loaded under pressure into said cylinder before, and maintained under pressure during, the final mechanical assembly steps of forced insertion of the shaft seal and bushing into the cylinder followed by crimping of said other end of the cylinder whereupon said spring link contains and retains an accurately pressurized and predetermined quantity of gas; and a permanent magnet means is mounted interior of said cylinder.

* * * * *

UNITED STATES PATENT AND TRADEMARK OFFICE
CERTIFICATE OF CORRECTION

PATENT NO.   : 4,718,647
DATED        : January 12, 1988
INVENTOR(S)  : GEORGE C. LUDWIG It is certified that error appears in the above-identified patent and that said Letters Patent is hereby corrected as shown below:

Column 7, line 64, after "o-ring 58" insert --into the cylinder. At the press stroke point where o-ring 58--.

Signed and Sealed this

Seventh Day of June, 1988

Attest:

DONALD J. QUIGG

*Attesting Officer*  *Commissioner of Patents and Trademarks*